United States Patent
Lee et al.

(10) Patent No.: US 11,987,267 B2
(45) Date of Patent: May 21, 2024

(54) METHOD AND MONITORING SERVER FOR VERIFYING OPERATION OF AUTONOMOUS VEHICLE USING QUALITY CONTROL VERIFYING APPLICATION

(71) Applicant: Obigo Inc., Seongnam-si (KR)

(72) Inventors: Young Suk Lee, Anyang-si (KR); Hak Jin Lee, Yongin-si (KR)

(73) Assignee: Obigo Inc., Seongnam-si (KR)

(*) Notice: Subject to any disclaimer, the term of this patent is extended or adjusted under 35 U.S.C. 154(b) by 269 days.

(21) Appl. No.: 17/498,167

(22) Filed: Oct. 11, 2021

(65) Prior Publication Data

US 2022/0119009 A1    Apr. 21, 2022

(30) Foreign Application Priority Data

Oct. 19, 2020  (KR) .................. 10-2020-0135355

(51) Int. Cl.
| | |
|---|---|
| *B60W 60/00* | (2020.01) |
| *G07C 5/00* | (2006.01) |
| *G07C 5/02* | (2006.01) |
| *G07C 5/08* | (2006.01) |
| *G08G 1/07* | (2006.01) |
| *H04W 4/40* | (2018.01) |

(52) U.S. Cl.
CPC ......... *B60W 60/0013* (2020.02); *G07C 5/008* (2013.01); *G07C 5/02* (2013.01); *G07C 5/0825* (2013.01); *G08G 1/07* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 2019/0049981 A1* | 2/2019 | Fischer | ................ G05D 1/0088 |
| 2022/0081011 A1* | 3/2022 | Kleinau | ............. G08G 1/09623 |

* cited by examiner

*Primary Examiner* — James J Lee
*Assistant Examiner* — Jonathan E Reinert
(74) *Attorney, Agent, or Firm* — Young Basile Hanlon & MacFarlane, P.C.

(57) ABSTRACT

A method for verifying an operation of an autonomous vehicle using a Quality Control verifying application is provided. The method includes steps of: (a) the monitoring server acquiring a certain driving PVD from the autonomous vehicle, wherein the certain driving PVD is a driving PVD corresponding to the autonomous vehicle's execution of a certain operation event at a certain subsection; (b) the monitoring server (i) performing a process of acquiring first verification result information including information on whether execution is successful for the certain operation event and (ii) performing a process of acquiring second verification result information including information on a result of determining whether the certain driving PVD matches with a certain criterion PVD by comparing the certain driving PVD with the certain criterion PVD; and (c) the monitoring server acquiring third verification result information by determining whether the first verification result information matches with the second result information.

16 Claims, 6 Drawing Sheets

FIG. 5A

| AUTONOMIZATION LEVEL | Lv 3 | VERIFICATION SCENARIO | | AFTERNOON, SYSTEM<br>LITTLE CLOUDY (NORMAL) | | ORDER OF<br>VERIFICATION | 0 5 2 |
|---|---|---|---|---|---|---|---|

| VERIFICATION STATUS | | VEHICLE 1 | ⊕ MANUAL ⊘ 0km ⊙ ACCUMULATED DISTANCE : (0.24km) AM : (0.24km) MM : (0.00km) |
|---|---|---|---|
| OBJECT DISTANCE | 3,000km | #001 | DRIVING CIRCUMSTANCE  VERIFICATION SCENARIO  VEHICLE  QC  VERIFICATION |
| TOTAL ACCUMULATED DISTANCE | 1,205km | | INTERSECTION-WAITING FOR SIGNAL  510  [SUBSECTION 1 \| STOP AT INTERSECTION] 515  PASS 525  PASS  COMPLETE 530 |
| PROGRESS IN PERCENTAGE | 0.0% | | 520 |
| DRIVING DISTANCE OF TODAY | 4km | VEHICLE 2 | ⊕ WAITING ⊘ 0km ⊙ ACCUMULATED DISTANCE : (0 km) AM : (0 km) MM : (0 km) |
| NUMBER OF VERIFICATION OF TODAY | 2 | | DRIVING CIRCUMSTANCE  VERIFICATION SCENARIO  VEHICLE  QC  VERIFICATION |
| | | | ▣  WAITING  -  -  - |
| | | VEHICLE 3 | ⊕ WAITING ⊘ 0km ⊙ ACCUMULATED DISTANCE : (0 km) AM : (0 km) MM : (0 km) |
| | | | DRIVING CIRCUMSTANCE  VERIFICATION SCENARIO  VEHICLE  QC  VERIFICATION |
| | | | ▣  WAITING  -  -  - |
| | | VEHICLE 4 | ⊕ WAITING ⊘ 0km ⊙ ACCUMULATED DISTANCE : (0 km) AM : (0 km) MM : (0 km) |
| | | | DRIVING CIRCUMSTANCE  VERIFICATION SCENARIO  VEHICLE  QC  VERIFICATION |
| | | | ▣  WAITING  -  -  - |

| VERIFICATION HISTORY | | | |
|---|---|---|---|
| ALL | TIME | COUNT | REPLAY |
| BUS01 | 08-19 05:08 | 50 | REPLAY |
| BUS01 | 08-19 02:08 | 49 | REPLAY |
| BUS01 | 08-19 02:08 | 48 | REPLAY |
| BUS01 | 08-19 02:08 | 47 | REPLAY |
| BUS01 | 08-19 02:08 | 46 | REPLAY |
| BUS01 | 08-19 01:08 | 42 | REPLAY |
| BUS01 | 08-19 01:08 | 41 | REPLAY |
| BUS01 | 08-19 01:08 | 40 | REPLAY |
| BUS01 | 08-19 01:08 | 39 | REPLAY |

METHOD AND MONITORING SERVER FOR VERIFYING OPERATION OF AUTONOMOUS VEHICLE USING QUALITY CONTROL VERIFYING APPLICATION

CROSS-REFERENCE TO RELATED APPLICATION(S)

This application claims priority to and the benefit of Korean Patent Application Serial No. 10-2020-0135355 filed Oct. 19, 2020, the entire disclosure of which is hereby incorporated by reference.

TECHNICAL FIELD

The present disclosure relates to a method and a monitoring server for verifying operations of autonomous vehicle by using QC (Quality Control) verifying application.

BACKGROUND

Recently, studies on an autonomous vehicle capable of driving to a destination without an intervention of a driver are conducted. The autonomous vehicle attracts attention as a future transportation which may decrease traffic accidents and increase conveniences.

It is necessary to evaluate a performance of controlling the autonomous vehicle precisely since malfunction of the autonomous vehicle causes a collision with a pedestrian or other vehicles.

However, researches on the evaluation of the performance of the autonomous vehicle are not satisfactory because tests are performed under an environment similar to a real road, not on the real road itself or tests are performed only for some parts of functions of the autonomous vehicle.

Moreover, there is a problem that most conventional methods of evaluating the performance of the autonomous vehicle cannot discriminate between operation data of an autonomous vehicle and actual operation of the autonomous vehicle because the conventional methods use the operation data of the autonomous vehicle only.

Therefore, it is necessary to propose a novel method capable of verifying a driving performance of the autonomous vehicle by verifying the operation data of the autonomous vehicle and the actual operation of the autonomous vehicle.

SUMMARY

It is an object of the present disclosure to solve all the aforementioned problems.

It is another object of the present disclosure to allow an autonomous vehicle to be verified by using operation data of the autonomous vehicle and confirmation data from a passenger about actual operations of the autonomous vehicle.

It is still another object of the present disclosure to allow information related to a verification of operations of the autonomous vehicle to be monitored through a monitoring display of a monitoring system.

In accordance with one aspect of the present invention, there is provided a method for verifying an operation of an autonomous vehicle using a Quality Control verifying application, wherein a certain verifying scenario is differentiated for each of subsections included in a certain road section, and each of criterion Probe Vehicle Data (PVD) for each of operation events including information on each of exact operations of the autonomous vehicle which should be performed for each of the subsections is stored in a database, and each of driving PVD of the autonomous vehicle is transmitted to a monitoring server, including steps of: (a) the monitoring server acquiring a certain driving PVD from the autonomous vehicle, wherein the certain driving PVD is a driving PVD of the autonomous vehicle corresponding to the autonomous vehicle's execution of a certain operation at a certain subsection among the plurality of subsections; (b) the monitoring server (i) performing a process of acquiring first verification result information including information on whether execution of the autonomous vehicle is successful for the certain operation event, wherein the first verification result information is received from a user in the autonomous vehicle through the Quality Control verifying application, and (ii) performing a process of acquiring second verification result information including information on a result of determining whether the certain driving PVD matches with a certain criterion PVD which is a criterion PVD of the certain operation event by comparing the certain driving PVD with the certain criterion PVD; and (c) the monitoring server acquiring third verification result information which is final verification result information on execution of the autonomous vehicle for the certain operation event by determining whether the first verification result information matches with the second result information.

As one example, the criterion PVD and the driving PVD respectively include (i) one or more standard fields which represent one or more data items of the autonomous vehicle whose data are standardized for a V2X telecommunication, and (ii) one or more non-standard fields which represent one or more data items of the autonomous vehicle whose data are used to verify the plurality of operation events.

As one example, wherein the monitoring server further acquires traffic signal information from a plurality of traffic signal controllers installed in the certain road section by using at least one way among (i) an indirect acquiring way which performs a process of allowing the autonomous vehicle to acquire the traffic signal information from the plurality of traffic signal controllers through the V2X telecommunication and a process of allowing the autonomous vehicle to transmit the traffic signal information and the driving PVD to the monitoring server at predetermined time intervals, and (ii) a direct acquiring way which performs a process of acquiring the traffic signal information from the traffic signal controllers through direct telecommunication.

As one example, the monitoring server displays or supports another device to display, by referring the certain driving PVD, information on a location of the autonomous vehicle 600 on a map in which the certain road section is included and wherein the monitoring server displays or supports another device to display either of (i) first access information which allows a monitoring manager to access vehicle status information and (ii) second access information which allows the monitoring manager to access verification status information As one example, in response to selecting the first access information by the monitoring manager, the monitoring server (i) displays or supports another device to display either of information related to an inner device status of the autonomous vehicle and information related to a driving status of the autonomous vehicle included in the vehicle status information and (ii) displays or supports another device to display the traffic signal information which includes at least part of information on traffic light located on a road, information on a certain speed limit and information on a certain traffic sign by further referring to the traffic signal information.

As one example, in response to selecting the second access information by the monitoring manager, the monitoring server displays or supports another device to display the verification status information which includes at least part of information on the certain subsection, information on the certain operation event, the first verification result information, the second verification result information and the third verification result information.

As one example, the first verification result information includes discomfort-related information inputted by the user, wherein the discomfort-related information is information corresponding to details about one or more cases in which the autonomous vehicle failed for the certain operation event.

As one example, the monitoring server (i) treats a verification for the certain operation event as completed in response to acquiring the third verification result information corresponding to the case in which the first verification result information matches with the second verification result information and (ii) documentate and save the first verification result information, the second verification result information and the third verification result information in response to acquiring the third verification result information corresponding to the case in which the first verification result information does not match with the second verification result information.

As one example, the monitoring server executes the step of (a) to the step of (c) repeatedly for each of the subsections.

As one example, the monitoring server (i) counts a cardinal number of times of circulation for the certain road section by repeating the verification for operation of the autonomous vehicle for each of the subsections, (ii) determines whether the cardinal number of times of circulation meets a missionary order data for the certain road section by referring to the missionary order data set as a mission for the certain road section, and (iii) in case the cardinal number of circulation does not meet the missionary order data, increases the cardinal number of times of circulation by repeating the verification for operation of the autonomous vehicle for the certain road section.

In accordance with still another aspect of the present invention, there is provided a monitoring server for verifying an operation of an autonomous vehicle using a Quality Control verifying application, wherein a certain verifying scenario is differentiated for each of subsections included in a certain road section, and wherein each of criterion Probe Vehicle Data (PVD) for each of operation events including information on each of exact operations of the autonomous vehicle which should be performed for each of the subsections is stored in a database, and each of driving PVD of the autonomous vehicle is transmitted to a monitoring server, including: one or more memories saving instructions; and one or more processors for performing (I) a process of acquiring a certain driving PVD from the autonomous vehicle, wherein the certain driving PVD is a driving PVD of the autonomous vehicle corresponding to the autonomous vehicle's execution of a certain operation event at a certain subsection among the plurality of subsections, (II) a process of acquiring (i) first verification result information including information on whether execution of the autonomous vehicle is successful for the certain operation event, wherein the first verification result information is received from a user in the autonomous vehicle through the Quality Control verifying application and (ii) second verification result information including information on a result of determining whether the certain driving PVD matches with a certain criterion PVD which is a criterion PVD of the certain operation event by comparing the certain driving PVD with the certain criterion PVD and (III) a process of acquiring third verification result information which is final verification result information on execution of the autonomous vehicle for the certain operation event by determining whether the first verification result information matches with the second result information.

As one example, the criterion PVD and the driving PVD respectively include (i) one or more standard fields which represent one or more data items of the autonomous vehicle whose data are standardized for a V2X telecommunication, and (ii) one or more non-standard fields which represent one or more data items of the autonomous vehicle whose data are used to verify the plurality of operation events.

As one example, the processor further acquires traffic signal information from a plurality of traffic signal controllers installed in the certain road section by using at least one way among (i) an indirect acquiring way which performs a process of allowing the autonomous vehicle to acquire the traffic signal information from the plurality of traffic signal controllers through the V2X telecommunication and a process of allowing the autonomous vehicle to transmit the traffic signal information and the driving PVD to the monitoring server at predetermined time intervals, and (ii) a direct acquiring way which performs a process of acquiring the traffic signal information from the traffic signal controllers through direct telecommunication.

As one example, the processor displays or supports another device to display, by referring the certain driving PVD, information on a location of the autonomous vehicle 600 on a map in which the certain road section is included and wherein the monitoring server displays or supports another device to display either of (i) first access information which allows a monitoring manager to access vehicle status information and (ii) second access information which allows the monitoring manager to access verification status information.

As one example, in response to selecting the first access information by the monitoring manager, the processor (i) displays or supports another device to display either of information related to an inner device status of the autonomous vehicle and information related to a driving status of the autonomous vehicle included in the vehicle status information and (ii) displays or supports another device to display the traffic signal information which includes at least part of information on traffic light located on a road, information on a certain speed limit and information on a certain traffic sign by further referring to the traffic signal information.

As one example, in response to selecting the second access information by the monitoring manager, the processor displays or supports another device to display the verification status information which includes at least part of information on the certain subsection, information on the certain operation event, the first verification result information, the second verification result information and the third verification result information.

As one example, the first verification result information includes discomfort-related information inputted by the user, wherein the discomfort-related information is information corresponding to details about one or more cases in which the autonomous vehicle failed for the certain operation event.

As one example, the processor (i) treats a verification for the certain operation event as completed in response to acquiring the third verification result information corresponding to the case in which the first verification result information matches with the second verification result information and (ii) documentate and save the first verification result information, the second verification result information and the third verification result information in response to acquiring the third verification result information corresponding to the case in which the first verification result information does not match with the second verification result information.

As one example, the processor executes the step of (I) to the step of (III) repeatedly for each of the subsections.

As one example, the processor (i) counts a cardinal number of times of circulation for the certain subsection by repeating the verification for operation of the autonomous vehicle for each of the subsections, (ii) determines whether the cardinal number of times of circulation meets a missionary order data set for the certain subsection, and (iii) if the cardinal number of circulation does not meet the missionary order data, the monitoring server increases the cardinal number of times of circulation by repeating the verification for operation of the autonomous vehicle for each of the subsections.

BRIEF DESCRIPTION OF THE DRAWINGS

The above and other objects and features of the present invention will become apparent from the following description of preferred embodiments given in conjunction with the accompanying drawings, in which:

FIG. 5A and FIG. 5B are drawings illustrating examples of a screen on which verifying status information of the autonomous vehicle is displayed in accordance with one example embodiment of the present invention.

DETAILED DESCRIPTION

Figure 1:
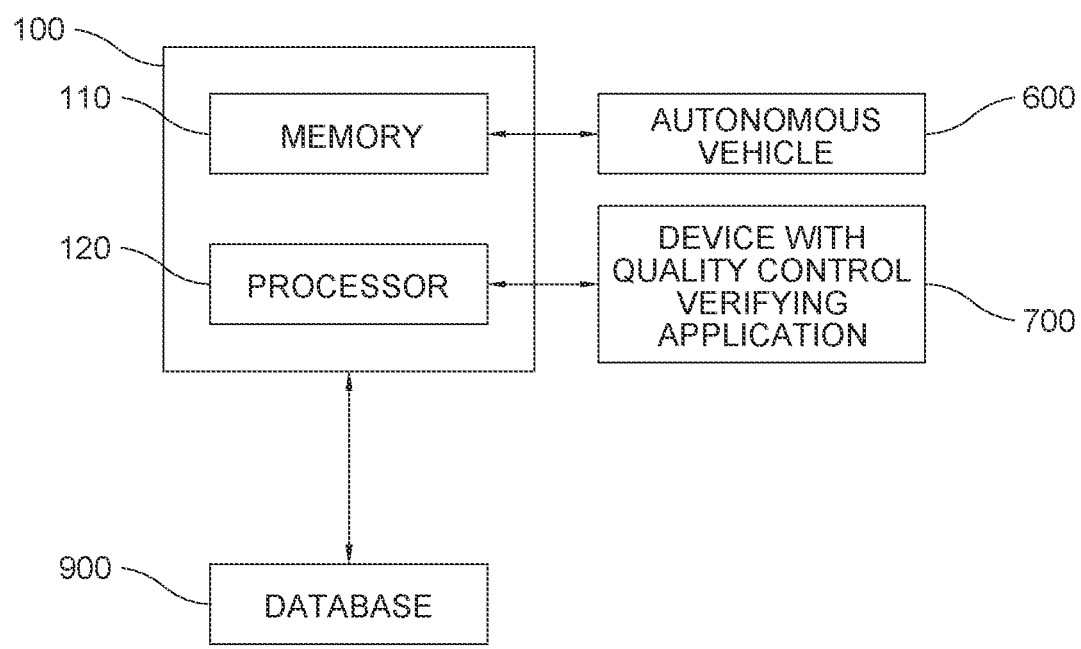
FIG. 1 is a drawing schematically illustrating a configuration of a monitoring server for verifying operations of an autonomous vehicle using a Quality Control application in accordance with one example embodiment of the present invention.

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar components throughout the several aspects.

To allow those skilled in the art to the present disclosure to be carried out easily, the example embodiments of the present disclosure by referring to attached diagrams will be explained in detail as shown below.

FIG. 1 is a drawing schematically illustrating a configuration of a monitoring server 100 for verifying operations of an autonomous vehicle using a Quality Control application in accordance with one example embodiment of the present invention.

As illustrated in FIG. 1, the monitoring server 100 may include a memory 110 and a processor 120.

The memory 110 may store instructions to be used by the processor 120. Specifically, the instructions are codes generated for instructing the monitoring server 100 to function in a certain way and may be stored in a computer usable memory or a computer readable memory that can be directed to a computer or other programmable data processing equipment. The instructions may perform processes of performing functions described in the specification of the present disclosure.

And, the processor 120 may include hardware configuration of MPU (Micro Processing Unit) or CPU (Central Processing Unit), cache memory, data bus, etc. Additionally, software configuration of OS and applications that achieve specific purposes may be further included.

Additionally, the monitoring server 100 may interact with a database 900 including information to be used for verifying operations of the autonomous vehicle using a Quality Control application. Herein, the database 900 may include at least one type of storage medium among a flash memory type, a hard disk type, a multimedia card micro type, and a card type memory (for example, SD or XD memory), Random Access Memory (RAM), Static Random Access Memory (SRAM), ReadOnly Memory (ROM), Electrically Erasable Programmable ReadOnly Memory (EEPROM), Programmable ReadOnly Memory (PROM), Magnetic Memory, Magnetic Disk, Optical Disk, but is not limited thereto and may include any storage medium capable of storing data. Also, the database 900 (i) may be installed separately from the monitoring server 100 or (ii) may be installed inside the monitoring server 100 or (iii) may be configured as being separated into two or more parts (not illustrated), which may vary as the case may be. Also, the database 900 may be stored with information related to a certain verifying scenario corresponding to a certain road section where the autonomous vehicle must drive for verification. Herein, the certain verifying scenario may be differentiated for each of subsections included in the certain road section and may include at least one exact operations of the autonomous vehicle which should be performed for each of the subsections. Additionally, each of criterion Probe Vehicle Data (PVD) for each of operation events including information on each of the exact operations of the autonomous vehicle for each of the subsections may be stored in the database 900.

Also, the monitoring server 100, via a communication part (not illustrated), may transmit or receive necessary information to or from an autonomous vehicle 600. Herein, the information may be transmitted to or received from the autonomous vehicle 600 via V2X communication using WAVE (Wireless Access in Vehicular Environments) known as wireless communication for vehicle (IEEE 802.11p), but is not limited thereto. Also, the monitoring server 100 may transmit or receive the necessary information to or from the autonomous vehicle 600 via a WAVE base station or a WAVE relay station (not illustrated) located between the monitoring server 100 and the autonomous vehicle 600. Herein, a standard related to a message set for transmitting and receiving data between the WAVE base station and the autonomous vehicle may be SAE J2735, but is not limited thereto.

Also, the monitoring server 100 may transmit and receive the necessary information to or from a device 700 where a Quality Control application is installed via the communication part (not illustrated). Herein, the device 700 may be a device included in a vehicle system of the autonomous vehicle or may be a separate device such as a smart phone, a tablet PC, etc.

Also, the monitoring server 100 may transmit and receive information on autonomous vehicle, information on buses, traffic information and road event information etc. via communication with external servers such as a server of public data portal, servers of local traffic information systems, etc.

A method for verifying operations of the autonomous vehicle through Quality Control verifying application by using the monitoring server 100 configured as above in accordance with one example of the present disclosure is described via step of S10 to step of S30 (not illustrated) as follows.

First, the monitoring server 100 may acquire certain driving Probe Vehicle Data (PVD) transmitted from the autonomous vehicle 600 at the step of S10.

Herein, the certain driving PVD may be at least part of driving PVD which represents data transmitted from the autonomous vehicle 600 (which is driving the certain road section) to the monitoring server 100. In detail, the certain driving PVD may be a driving PVD of the autonomous vehicle 600 corresponding to an execution of a certain operation event at a certain subsection among a plurality of subsections stored in the database 900. Herein, the autonomous vehicle 600 may transmit the driving PVD to the monitoring server 100 for every predetermined period or may transmit the driving PVD to the monitoring server 100 only under a certain situation in which the autonomous vehicle 600 executes the certain operation event, but is not limited thereto.

Also, the criterion PVD stored in the database 900 and the driving PVD transmitted from the autonomous vehicle 600 to the monitoring server 100 respectively may include (i) standard fields which represent one or more data items of the autonomous vehicle 600 whose data are standardized for a V2X telecommunication and (ii) non-standard fields which represent one or more data items of the autonomous vehicle 600 whose data are used to verify the plurality of operation events. Herein, the standard fields may include items about standardized information of the autonomous vehicle 600 such as longitude, latitude, altitude, direction, velocity, etc. transmitted and received via the V2X communication in general. Also, the non-standard fields may include items about information added arbitrarily for verifying an operation of the autonomous vehicle 600 by using the Quality Control verifying application in accordance with the present disclosure.

And, the monitoring server 100 may acquire (i) first verification result information including information on whether execution of the autonomous vehicle is successful for the certain operation event, where the first verification result information is received from a user in the autonomous vehicle through the Quality Control verifying application and (ii) second verification result information including information on a result of determining whether the certain driving PVD matches with a certain criterion PVD which is a criterion PVD of the certain operation event by comparing the certain driving PVD with the certain criterion PVD at the step of S20.

That is, the user may (i) confirm an operation executed by the autonomous vehicle 600 for the certain operation event, (ii) input whether the operation executed by the autonomous vehicle is successful or not for the certain operation event into the device 700 where the Quality Control verifying application is running and (iii) make the first verification result information transmitted from the device 700 to the monitoring server 100. Herein, (i) information on the certain subsection where the autonomous vehicle 600 locates, (ii) information on the certain operation event which is acquired by an execution of the autonomous vehicle 600, and (iii) a success icon and a failure icon for selecting, by the user, whether the execution of the autonomous vehicle 600 for the certain operation event is successful or failed may be displayed on the device 700 where the Quality Control verifying application is running.

Also, the first verification result information may include discomfort-related information inputted by the user. Herein, the discomfort-related information may be information on the fact that the autonomous vehicle has failed the execution of the certain operation event and its corresponding detailed explanation on at least one reason of failure thereof. That is, the user may (i) input the discomfort-related information for the certain operation event into the device 700 and (ii) make the first verification result information transmitted from the device 700 to the monitoring server 100. Herein, the discomfort-related information may include sudden stop, traffic accident, course deviation, road deviation, failure of detecting obstacles, etc., but it is not limited thereto. Herein, a plurality of additional icons for allowing at least one piece of the discomfort-related information to be selected. Further, as another example, an edit box for allowing a user to input a sentence regarding the discomfort-related information.

Figure 2:
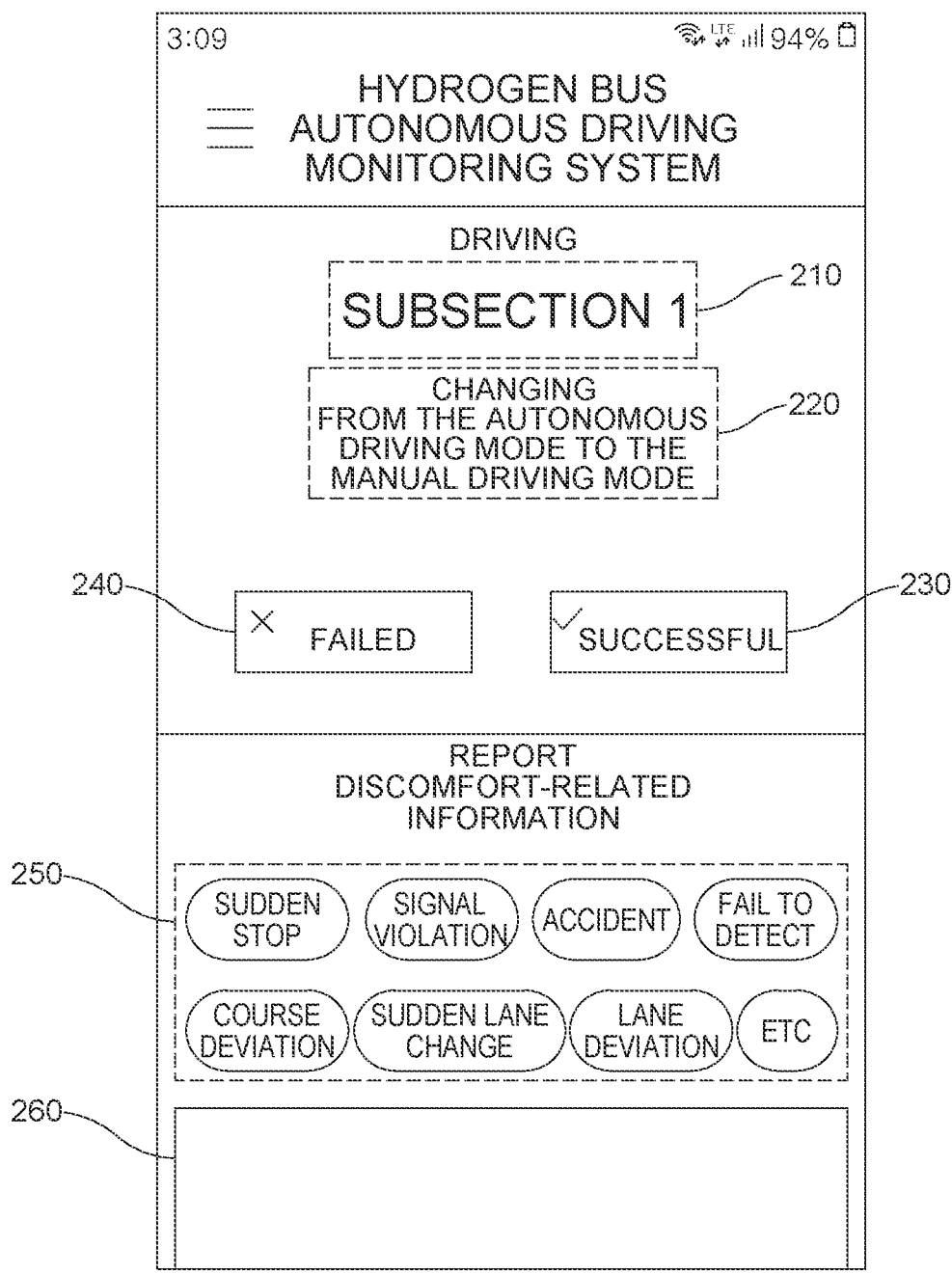
FIG. 2 is a drawing illustrating an example of a screen of a device on which the Quality Control application is running in accordance with one example embodiment of the present invention.

For example, by referring to FIG. 2, supposing that the certain subsection where the autonomous vehicle 600 is located is a 'subsection 1' and the certain operation event is a 'changing from an autonomous driving mode to a manual driving mode', (i) the 'subsection 1' 210 and (ii) 'changing from the autonomous driving mode to the manual driving mode' 220 on the certain operation event may be displayed on the screen of the device 700. Also, a success icon 230 and a failure icon 240 which allow the user to select according to whether the certain operation event executed by the autonomous vehicle 600 is successful or not. Further, as mentioned above, the plurality of additional icons, i.e., so-called discomfort-related information icons 250, for allowing the user to select at least one of the icons 250 corresponding to a reason of failure are displayed on the screen of the device 700. Furthermore, as mentioned above, the edit box 260 for allowing the user to input a sentence regarding the discomfort-related information are displayed on the screen of the device 700.

Also, the monitoring server 100 may acquire the second verification result information including information on the result of determining whether the certain driving PVD matches with the certain criterion PVD which is a criterion PVD of the certain operation event by comparing a part of the certain driving PVD with a part of the certain criterion PVD. As another example, the monitoring server 100 may acquire the second verification result information by comparing only data of the non-standard fields in the certain driving PVD and only data of the non-standard fields in the criterion driving PVD.

Also, the monitoring server 100 may acquire the second verification result information as 'successful' in case the certain driving PVD matches with the certain criterion PVD and as 'failed' in case the certain driving PVD does not match with the certain criterion PVD.

Next, the monitoring server 100 may acquire third verification result information which is final verification result information on execution of the autonomous vehicle for the certain operation event, of operation executed by the autonomous vehicle 600 by determining whether the first verification result information matches with the second result information at the step of S30.

Herein, each of the first verification result information and the second verification result information may be either 'successful' or 'failed'.

Meanwhile, the monitoring server 100, as a result of performing the step of S10 to the step of S30 (not illustrated) as mentioned above, (i) may treat a verification for the certain operation event as completed in response to acquiring the third verification result information corresponding to a case where the first verification result information matches with the second verification result information and (ii) may documentate and save the first verification result information, the second verification result information and the third verification result information in response to acquiring the third verification result information corresponding to a case where the first verification result information does not match with the second verification result information. Herein, (i) the case where the first verification result information matches with the second verification result information may correspond to a case where both the first verification result information and the second verification result information are 'successful' and (ii) the case where the first verification result information does not match with the second verification result information may correspond to a case where both the first verification result information and the second verification result information are 'failed'.

That is, the monitoring server 100, in case both the first verification result information and the second verification result information are 'successful', decides that the autonomous vehicle 600 performs the certain operation event successfully to thereby treat a verification of the certain operation event as completed.

Also, the monitoring server 100, in case the first verification result information does not match with the second verification result information, that is, in case an operation executed by the autonomous vehicle 600 is different from the certain operation event, (i) may treat a verification of the certain operation event related to the autonomous vehicle 600 as not completed and (ii) may allow the first verification result information, the second verification result information and the third verification result information to be stored as reference data for future review by documentating and saving the first verification result information, the second verification result information and the third verification result information.

Meanwhile, the monitoring server 100 may execute the step of S10 to the step of S30 as mentioned above repeatedly for each of the subsections.

That is, the monitoring server 100 may verify the autonomous vehicle 600's execution of operation events for each of the subsections according to a method mentioned in the step of S10 to the step of S30.

Herein, the monitoring server 100 (i) may count a cardinal number of times of circulation for the certain road section by repeating a verification for operation of the autonomous vehicle for each of the subsections, (ii) may determine whether the cardinal number of times of the circulation meets a missionary order data for the certain road section by referring to the missionary order data set as a mission for the certain road section and (iii) in case the cardinal number of times of the circulation does not meet the missionary order data, may increase the cardinal number of times of the circulation by repeating the verification for operation of the autonomous vehicle 600 for the certain road section.

Meanwhile, the monitoring server 100, while executing the step of S10 to the step of S30, may further acquire traffic signal information from a plurality of traffic signal controllers installed in the certain road section. Herein, the monitoring server 100 may acquire the traffic signal information by using at least one way among (i) an indirect acquiring way which performs a process of allowing the autonomous vehicle 600 to acquire the traffic signal information from the plurality of traffic signal controllers through the V2X telecommunication and a process of allowing the autonomous vehicle 600 to transmit the traffic signal information and the driving PVD to the monitoring server 100 at predetermined time intervals, and (ii) a direct acquiring way which performs a process of acquiring the traffic signal information from the traffic signal controllers through direct telecommunication. Also, the monitoring server 100 may acquire the traffic signal information by using both the indirect acquiring way and the direct acquiring way.

And, the monitoring server 100 may display or support another device to display, by referring the certain driving PVD, the location of the autonomous vehicle 600 on a map in which the certain road section is included. And the monitoring server 100 may display or support another device to display either of (i) first access information which allows a monitoring manager to access vehicle status information and (ii) second access information which allows the monitoring manager to access verification status information. Herein, the autonomous 600 may be a hydrogen bus, but it is not limited thereto.

Figure 3:
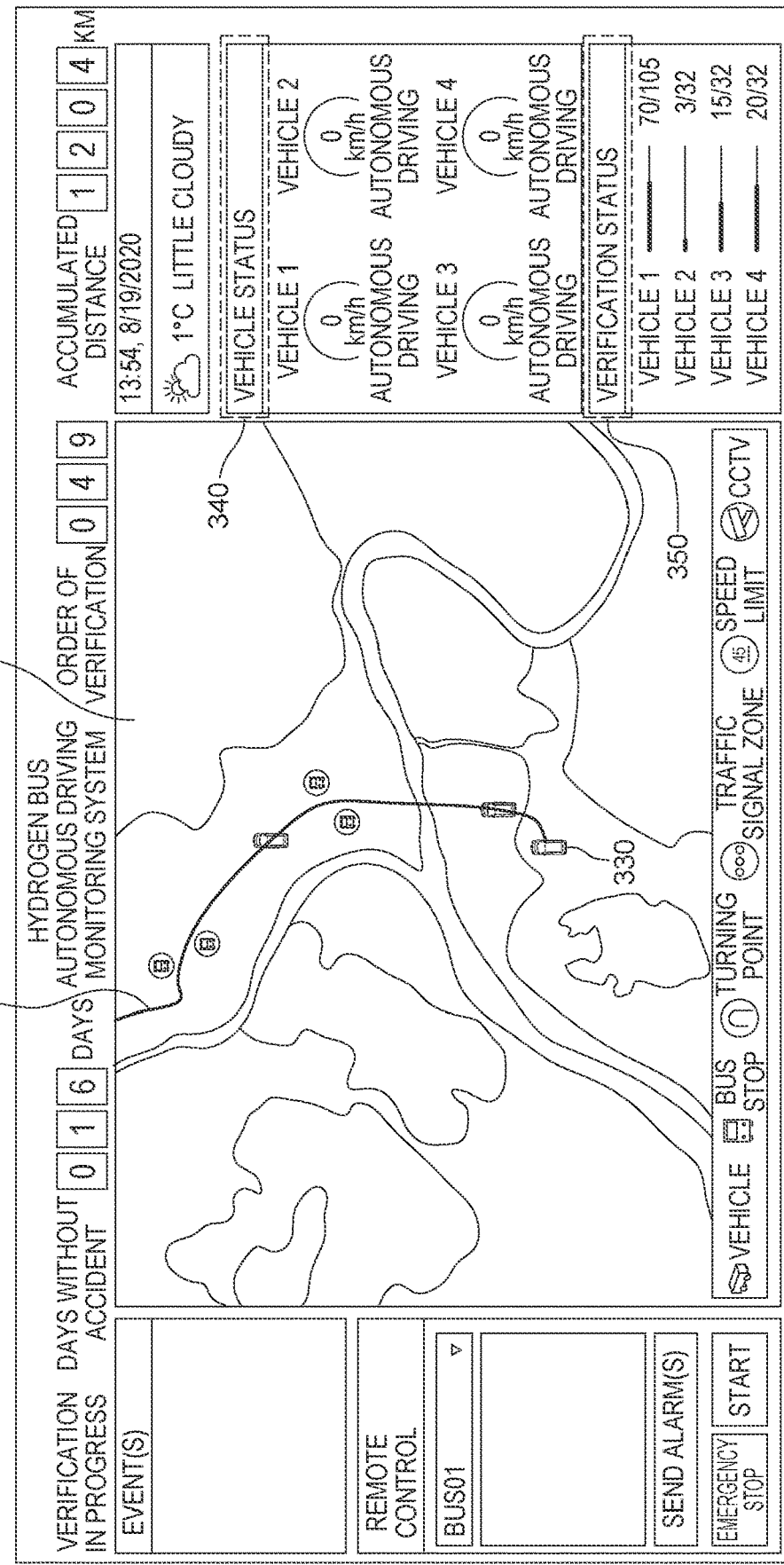
FIG. 3 is a drawing illustrating an example of a screen of a monitoring display of a monitoring system in accordance with one example embodiment of the present invention.

For example, by referring to FIG. 3, a map 310 including a certain road section 320 and a location of an autonomous vehicle 330 is displayed. Herein, the location of the autonomous vehicle 330 may vary according to a movement of the autonomous vehicle 600 in actual. Also, (i) first access information 340 and second access information 350, (ii) a cardinal number of times of circulation 360 of the autonomous vehicle 600 and (iii) accumulated distance information 370 which represents a mileage of the autonomous vehicle 600 are displayed.

Also, the monitoring server 100, in response to selecting the first access information by the monitoring manager, (i) may display or support another device to display either of information related to an inner device status of the autonomous vehicle 600 and information related to a driving status of the autonomous vehicle 600 included in the vehicle status information and (ii) may display or support another device to display the traffic signal information which includes at least part of information on traffic light located on a road, information on a certain speed limit and information on a certain traffic sign by further referring to the traffic signal information.

Figure 4:
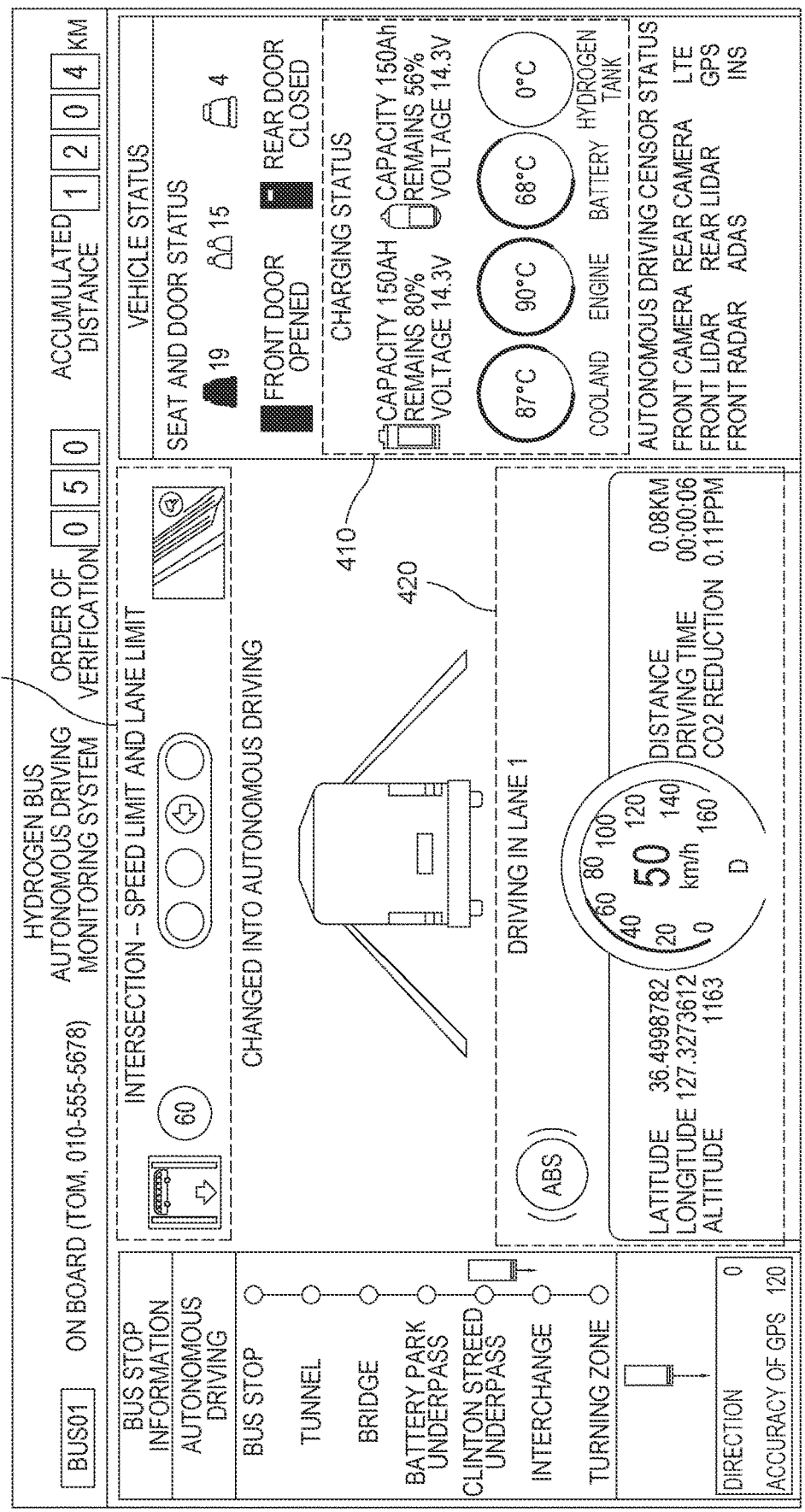
FIG. 4 is a drawing illustrating an example of a screen on which vehicle status information of the autonomous vehicle is displayed in accordance with one example embodiment of the present invention.

For example, by referring to FIG. 4 supposing that the autonomous vehicle 600 is a hydrogen bus, (i) information 410 related to the inner device status included in the vehicle status information of the autonomous vehicle 600 such as a temperature of coolant, a temperature of an engine, a temperature of a battery, a temperature of a hydrogen tank, a battery charging status, etc. and (ii) information 420 related to the driving status of the autonomous vehicle 600 such as longitude, latitude, altitude, velocity, driving distance, driving duration, etc. are displayed. Also, traffic signal information 430 which includes information on traffic light located on a road, information on a certain speed limit, information on a certain traffic sign and etc. are displayed.

Also, the monitoring server 100, in response to selecting the second access information by the monitoring manager, may display or support another device to display the verification status information which includes at least part of the information on the certain subsection, the information on the certain operation event, the first verification result information, the second verification result information and the third verification result information.

For example, by referring to FIG. 5A, information 510 on the certain subsection, information 515 on the certain operation event, the first verification result information 520, the second verification result information 525 and the third verification result information 530 are displayed. Herein, 'PASS' as the first verification result information 520 and 'PASS' as the second verification result information 525 may represent 'successful'.

As a reference, FIG. 5A depicts a status in which the monitoring server 100 acquires all of the first verification result information, the second verification result information and the third verification result information. In case the monitoring server 100 does not acquire some part of the first verification result information and the second verification result information, said some part of the first verification result information and the second verification result information may be displayed as 'IN PROGRESS' and the third verification result information may be displayed as 'WAITING'. Also, in case either of the first verification result information and the second verification result information corresponds to the 'failed', its corresponding verification result information may be displayed as 'FAIL'.

Figure 5B:
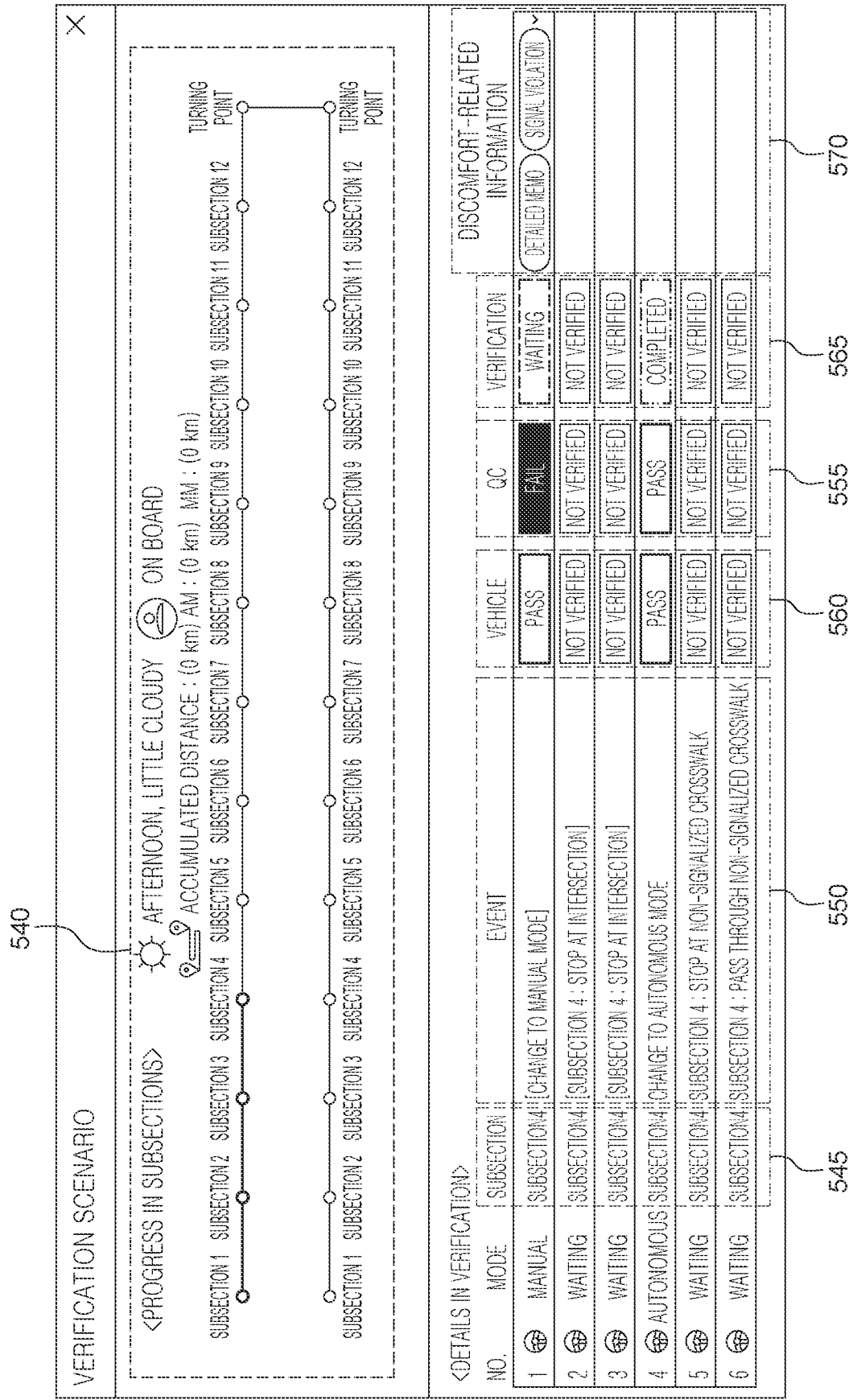

As an another example, by referring to FIG. 5B, (i) progress information 540 representing information related to a part of subsections where the verification has already been completed among all the subsections, (ii) information 545 on the subsections and (iii) information 550 on each of operation events corresponding to each of the subsections are displayed. Also, first verification result information 555, second verification result information 560, third verification result information 565 and discomfort-related information 570 corresponding to each of the subsections are displayed.

As above, the monitoring manager, via a monitoring system, may figure out not only a location of autonomous vehicle, driving path, inner status and driving status but also the verification results about the operation events executed by the autonomous vehicle in real time.

Meanwhile, at the step of S20, the user, via voice recognition, may input the first verification result information including information on whether execution of the autonomous vehicle is successful for the certain operation event into the device 700 where the Quality Control verifying application is running.

The present invention has an effect of allowing the autonomous vehicle to be verified by using operation data of the autonomous vehicle and confirmation data from a passenger about actual operations of the autonomous vehicle.

The present invention has another effect of allowing information related to the verification of operations of the autonomous vehicle to be monitored through the monitoring display of the monitoring system.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for verifying an operation of an autonomous vehicle using a Quality Control verifying application, wherein a certain verifying scenario is differentiated for each of subsections included in a certain road section, and wherein each of criterion Probe Vehicle Data (PVD) for each of operation events including information on each of exact operations of the autonomous vehicle that should be performed for each of the subsections is stored in a database, and each of driving PVD of the autonomous vehicle is transmitted to a monitoring server, comprising steps of:
   (a) the monitoring server acquiring a certain driving PVD from the autonomous vehicle, wherein the certain driving PVD is a driving PVD of the autonomous vehicle corresponding to the autonomous vehicle's execution of a certain operation event at a certain subsection among a plurality of subsections;
   (b) the monitoring server (i) performing a process of acquiring first verification result information including information on whether execution of the autonomous vehicle is successful for the certain operation event, wherein the first verification result information is received from a user in the autonomous vehicle through the Quality Control verifying application, and (ii) performing a process of acquiring second verification result information including information on a result of determining whether the certain driving PVD matches with a certain criterion PVD that is a criterion PVD of the certain operation event by comparing the certain driving PVD with the certain criterion PVD;

(c) the monitoring server acquiring third verification result information that is final verification result information on execution of the autonomous vehicle for the certain operation event by determining whether the first verification result information matches with the second verification result information;

(d) the monitoring server acquiring traffic signal information from a plurality of traffic signal controllers installed in the certain road section by using at least one of (i) an indirect acquiring way that performs a process of allowing the autonomous vehicle to acquire the traffic signal information from the plurality of traffic signal controllers through a V2X telecommunication and a process of allowing the autonomous vehicle to transmit the traffic signal information and the driving PVD to the monitoring server at predetermined time intervals, or (ii) a direct acquiring way that performs a process of acquiring the traffic signal information from the traffic signal controllers through direct telecommunication;

(e) the monitoring server displaying or supporting another device to display, by referring the certain driving PVD, information on a location of the autonomous vehicle on a map in which the certain road section is included, and the monitoring server displaying or supporting another device to display at least one of (i) first access information that allows a monitoring manager to access vehicle status information or (ii) second access information that allows the monitoring manager to access verification status information; and (f) in response to selecting the second access information by the monitoring manager, the monitoring server displaying or supporting another device to display the verification status information that includes at least part of information on the certain subsection, information on the certain operation event, the first verification result information, the second verification result information, and the third verification result information, thus evaluating a performance of controlling the autonomous vehicle and improving the autonomous vehicle.

2. The method of claim 1, wherein the criterion PVD and the driving PVD respectively include (i) one or more standard fields that represent one or more data items of the autonomous vehicle whose data are standardized for a V2X telecommunication, and (ii) one or more non-standard fields that represent one or more data items of the autonomous vehicle whose data are used to verify a plurality of operation events.

3. The method of claim 1, wherein, in response to selecting the first access information by the monitoring manager, the monitoring server (i) displays or supports another device to display either of information related to an inner device status of the autonomous vehicle and information related to a driving status of the autonomous vehicle included in the vehicle status information and (ii) displays or supports another device to display the traffic signal information that includes at least part of information on traffic light located on a road, information on a certain speed limit, and information on a certain traffic sign by further referring to the traffic signal information.

4. A method for verifying an operation of an autonomous vehicle using a Quality Control verifying application, wherein a certain verifying scenario is differentiated for each of subsections included in a certain road section, and wherein each of criterion Probe Vehicle Data (PVD) for each of operation events including information on each of exact operations of the autonomous vehicle that should be performed for each of the subsections is stored in a database, and each of driving PVD of the autonomous vehicle is transmitted to a monitoring server, comprising steps of:

(a) the monitoring server acquiring a certain driving PVD from the autonomous vehicle, wherein the certain driving PVD is a driving PVD of the autonomous vehicle corresponding to the autonomous vehicle's execution of a certain operation event at a certain subsection among a plurality of subsections;

(b) the monitoring server (i) performing a process of acquiring first verification result information including information on whether execution of the autonomous vehicle is successful for the certain operation event, wherein the first verification result information is received from a user in the autonomous vehicle through the Quality Control verifying application, and (ii) performing a process of acquiring second verification result information including information on a result of determining whether the certain driving PVD matches with a certain criterion PVD that is a criterion PVD of the certain operation event by comparing the certain driving PVD with the certain criterion PVD;

(c) the monitoring server acquiring third verification result information that is final verification result information on execution of the autonomous vehicle for the certain operation event by determining whether the first verification result information matches with the second verification result information;

(d) the monitoring server displaying or supporting another device to display at least one of (i) first access information that allows a monitoring manager to access vehicle status information or (ii) second access information that allows the monitoring manager to access verification status information; and (e) in response to selecting the second access information by the monitoring manager, the monitoring server displaying or supporting another device to display the verification status information that includes at least part of information on the certain subsection, information on the certain operation event, the first verification result information, the second verification result information, and the third verification result information, thus evaluating a performance of controlling the autonomous vehicle and improving the autonomous vehicle, wherein the first verification result information includes discomfort-related information inputted by the user, wherein the discomfort-related information is information corresponding to details about one or more cases in which the autonomous vehicle failed for the certain operation event.

5. A method for verifying an operation of an autonomous vehicle using a Quality Control verifying application, wherein a certain verifying scenario is differentiated for each of subsections included in a certain road section, and wherein each of criterion Probe Vehicle Data (PVD) for each of operation events including information on each of exact operations of the autonomous vehicle that should be performed for each of the subsections is stored in a database, and each of driving PVD of the autonomous vehicle is transmitted to a monitoring server, comprising steps of:

(a) the monitoring server acquiring a certain driving PVD from the autonomous vehicle, wherein the certain driving PVD is a driving PVD of the autonomous vehicle corresponding to the autonomous vehicle's execution of a certain operation event at a certain subsection among a plurality of subsections;

(b) the monitoring server (i) performing a process of acquiring first verification result information including information on whether execution of the autonomous vehicle is successful for the certain operation event, wherein the first verification result information is received from a user in the autonomous vehicle through the Quality Control verifying application, and (ii) performing a process of acquiring second verification result information including information on a result of determining whether the certain driving PVD matches with a certain criterion PVD that is a criterion PVD of the certain operation event by comparing the certain driving PVD with the certain criterion PVD;

(c) the monitoring server acquiring third verification result information that is final verification result information on execution of the autonomous vehicle for the certain operation event by determining whether the first verification result information matches with the second verification result information;

(d) the monitoring server displaying or supporting another device to display, by referring the certain driving PVD, information on a location of the autonomous vehicle on a map in which the certain road section is included, and the monitoring server displaying or supporting another device to display at least one of (i) first access information that allows a monitoring manager to access vehicle status information or (ii) second access information that allows the monitoring manager to access verification status information; and (e) in response to selecting the second access information by the monitoring manager, the monitoring server displaying or supporting another device to display the verification status information that includes at least part of information on the certain subsection, information on the certain operation event, the first verification result information, the second verification result information, and the third verification result information, thus evaluating a performance of controlling the autonomous vehicle and improving the autonomous vehicle, wherein the monitoring server (i) treats a verification for the certain operation event as completed in response to acquiring the third verification result information corresponding to a case in which the first verification result information matches with the second verification result information and (ii) document and save the first verification result information, the second verification result information, and the third verification result information in response to acquiring the third verification result information corresponding to the case in which the first verification result information does not match with the second verification result information wherein the first verification result information, the second verification result information, and the third verification result information documented and saved are used for evaluating a performance of controlling the autonomous vehicle to thereby improve the autonomous vehicle.

6. A method for verifying an operation of an autonomous vehicle using a Quality Control verifying application, wherein a certain verifying scenario is differentiated for each of subsections included in a certain road section, and wherein each of criterion Probe Vehicle Data (PVD) for each of operation events including information on each of exact operations of the autonomous vehicle that should be performed for each of the subsections is stored in a database, and each of driving PVD of the autonomous vehicle is transmitted to a monitoring server, comprising steps of:

(a) the monitoring server acquiring a certain driving PVD from the autonomous vehicle, wherein the certain driving PVD is a driving PVD of the autonomous vehicle corresponding to the autonomous vehicle's execution of a certain operation event at a certain subsection among a plurality of subsections;

(b) the monitoring server (i) performing a process of acquiring first verification result information including information on whether execution of the autonomous vehicle is successful for the certain operation event, wherein the first verification result information is received from a user in the autonomous vehicle through the Quality Control verifying application, and (ii) performing a process of acquiring second verification result information including information on a result of determining whether the certain driving PVD matches with a certain criterion PVD that is a criterion PVD of the certain operation event by comparing the certain driving PVD with the certain criterion PVD;

(c) the monitoring server acquiring third verification result information that is final verification result information on execution of the autonomous vehicle for the certain operation event by determining whether the first verification result information matches with the second verification result information;

(d) the monitoring server displaying or supporting another device to display at least one of (i) first access information that allows a monitoring manager to access vehicle status information or (ii) second access information that allows the monitoring manager to access verification status information; and (e) in response to selecting the second access information by the monitoring manager, the monitoring server displaying or supporting another device to display the verification status information that includes at least part of information on the certain subsection, information on the certain operation event, the first verification result information, the second verification result information, and the third verification result information, thus evaluating a performance of controlling the autonomous vehicle and improving the autonomous vehicle, wherein the monitoring server executes the step of (a) to the step of (c) repeatedly for each of the subsections.

7. The method of claim 6, wherein the monitoring server (i) counts a cardinal number of times of circulation for the certain road section by repeating the verification for operation of the autonomous vehicle for each of the subsections, (ii) determines whether the cardinal number of times of circulation meets a missionary order data for the certain road section by referring to a missionary order data set as a mission for the certain road section, and (iii) in case a cardinal number of circulation does not meet the missionary order data, increases the cardinal number of times of circulation by repeating a verification for operation of the autonomous vehicle for the certain road section.

8. A monitoring server verifying an operation of an autonomous vehicle using a Quality Control verifying application, wherein a certain verifying scenario is differentiated for each of subsections included in a certain road section, and wherein each of criterion Probe Vehicle Data (PVD) for each of operation events including information on each of exact operations of the autonomous vehicle that should be performed for each of the subsections is stored in a database, and each of driving PVD of the autonomous vehicle is transmitted to a monitoring server, comprising:

one or more memories saving instructions; and one or more processors for performing (I) a process of acquiring a certain driving PVD from the autonomous vehicle, wherein the certain driving PVD is a driving PVD of the autonomous vehicle corresponding to the autonomous vehicle's execution of a certain operation event at a certain subsection among a plurality of subsections, (II) a process of acquiring (i) first verification result information including information on whether execution of the autonomous vehicle is successful for the certain operation event, wherein the first verification result information is received from a user in the autonomous vehicle through the Quality Control verifying application and (ii) second verification result information including information on a result of determining whether the certain driving PVD matches with a certain criterion PVD that is a criterion PVD of the certain operation event by comparing the certain driving PVD with the certain criterion PVD, (III) a process of acquiring third verification result information that is final verification result information on execution of the autonomous vehicle for the certain operation event by determining whether the first verification result information matches with the second verification result information, (IV) a process of displaying or supporting another device to display at least one of (i) first access information that allows a monitoring manager to access vehicle status information or (ii) second access information that allows the monitoring manager to access verification status information, and (V) in response to the second access information being selected, a process of displaying or supporting another device to display the verification status information that includes at least part of information on the certain subsection, information on the certain operation event, the first verification result information, the second verification result information, and the third verification result information, thus evaluating a performance of controlling the autonomous vehicle and improving the autonomous vehicle, wherein the processor executes the step of (I) to the step of (III) repeatedly for each of the subsections.

9. The monitoring server of claim 8, wherein the criterion PVD and the driving PVD respectively include (i) one or more standard fields that represent one or more data items of the autonomous vehicle whose data are standardized for a V2X telecommunication, and (ii) one or more non-standard fields that represent one or more data items of the autonomous vehicle whose data are used to verify a plurality of operation events.

10. The monitoring server of claim 8, wherein the processor further acquires traffic signal information from a plurality of traffic signal controllers installed in the certain road section by using at least one way among (i) an indirect acquiring way that performs a process of allowing the autonomous vehicle to acquire the traffic signal information from the plurality of traffic signal controllers through a V2X telecommunication and a process of allowing the autonomous vehicle to transmit the traffic signal information and the driving PVD to the monitoring server at predetermined time intervals, and (ii) a direct acquiring way that performs a process of acquiring the traffic signal information from the traffic signal controllers through direct telecommunication..

11. The monitoring server of claim 10, wherein the processor displays or supports another device to display, by referring the certain driving PVD, information on a location of the autonomous vehicle on a map in which the certain road section is included, and wherein the monitoring server displays or supports another device to display at least one of (i) first access information that allows a monitoring manager to access vehicle status information or (ii) second access information that allows the monitoring manager to access verification status information.

12. The monitoring server of claim 11, wherein, in response to selecting the first access information by the monitoring manager, the processor (i) displays or supports another device to display at least one of information related to an inner device status of the autonomous vehicle and information related to a driving status of the autonomous vehicle included in the vehicle status information or (ii) displays or supports another device to display the traffic signal information that includes at least part of information on traffic light located on a road, information on a certain speed limit, and information on a certain traffic sign by further referring to the traffic signal information.

13. The monitoring server of claim 11, wherein, in response to selecting the second access information by the monitoring manager, the processor displays or supports another device to display the verification status information that includes at least part of information on the certain subsection, information on the certain operation event, the first verification result information, the second verification result information, and the third verification result information.

14. The monitoring server of claim 8, wherein the first verification result information includes discomfort-related information inputted by the user, wherein the discomfort-related information is information corresponding to details about one or more cases in which the autonomous vehicle failed for the certain operation event.

15. The monitoring server of claim 8, wherein the processor (i) treats a verification for the certain operation event as completed in response to acquiring the third verification result information corresponding to a case in which the first verification result information matches with the second verification result information and (ii) document and save the first verification result information, the second verification result information, and the third verification result information in response to acquiring the third verification result information corresponding to the case in which the first verification result information does not match with the second verification result information.

16. The monitoring server of claim 8, wherein the processor (i) counts a cardinal number of times of circulation for the certain road section by repeating the verification for operation of the autonomous vehicle for each of the subsections, (ii) determines whether the cardinal number of times of circulation meets a missionary order data for the certain road section by referring to a missionary order data set as a mission for the certain road section, and (iii) in case a cardinal number of circulation does not meet the missionary order data, increases the cardinal number of times of circulation by repeating a verification for operation of the autonomous vehicle for a certain road section.

* * * * *